United States Patent [19]

Oetiker

[11] Patent Number: 5,190,323
[45] Date of Patent: Mar. 2, 1993

[54] HIGH PRESSURE COUPLING

[76] Inventor: Hans Oetiker, Oberdorfstrasse 21, CH-8812 Horgen, Switzerland

[21] Appl. No.: 676,349

[22] Filed: Mar. 28, 1991

Related U.S. Application Data

[62] Division of Ser. No. 472,280, Nov. 1, 1990, Pat. No. 5,031,301.

[51] Int. Cl.⁵ .............................................. F16L 33/20
[52] U.S. Cl. ..................................... 285/39; 285/256; 285/258; 285/259
[58] Field of Search ................... 285/258, 259, 256, 39

[56] References Cited

U.S. PATENT DOCUMENTS

| | | | |
|---|---|---|---|
| 2,295,840 | 8/1938 | Grint | 285/258 |
| 4,106,526 | 8/1978 | Szentmihaly | 285/259 X |

FOREIGN PATENT DOCUMENTS

| | | | |
|---|---|---|---|
| 2305466 | 8/1974 | Fed. Rep. of Germany | 285/259 |
| 2532624 | 2/1977 | Fed. Rep. of Germany | 285/258 |
| 666183 | 2/1952 | United Kingdom | 285/258 |

Primary Examiner—Dave W. Arola
Attorney, Agent, or Firm—Paul M. Craig, Jr.

[57] ABSTRACT

A high pressure coupling for hose-like objects in which the nipple structure includes a main portion, a connecting nipple portion extending from the main portion in one direction and a nipple portion extending from the main portion in the opposite direction. A sleeve-like member made from tubular stock is adapted to be securely connected to the nipple structure by crimping, flanging or the like. The nipple portion includes outwardly projecting, rounded-off ribs cooperating with rounded-off grooves in the sleeve-like member so that the hose inserted between the nipple portion and the sleeve-like member is held securely in position after the nipple portion is internally expanded with subsequent reduction of the cylindrical surface of the sleeve-like member. Both the nipple structure as well as the sleeve-like member are made from appropriate stock machined accurately to the required dimensions. Sharp edges provided in the nipple main portion will anchor themselves securely in the crimped or flanged-over end of the sleeve-like member to assure a secure fastening between these two parts.

20 Claims, 4 Drawing Sheets

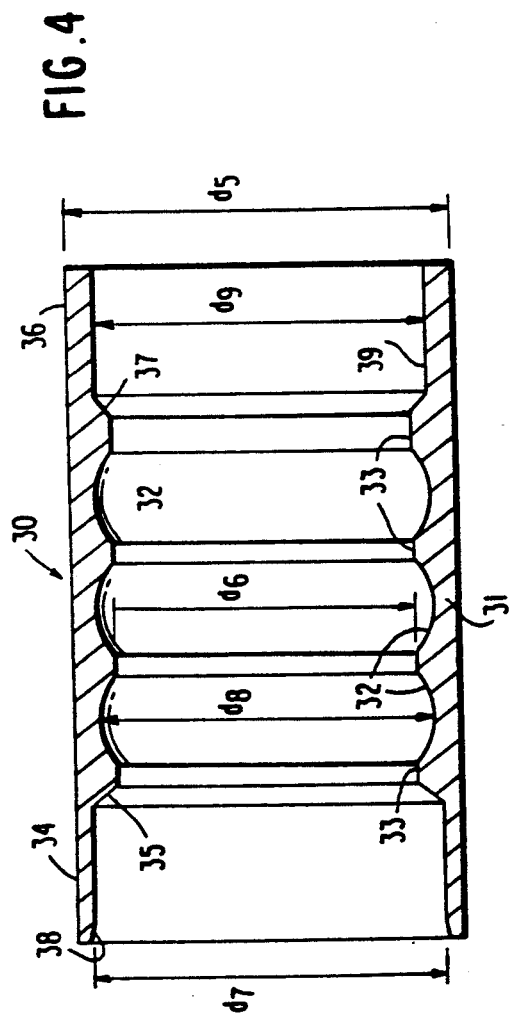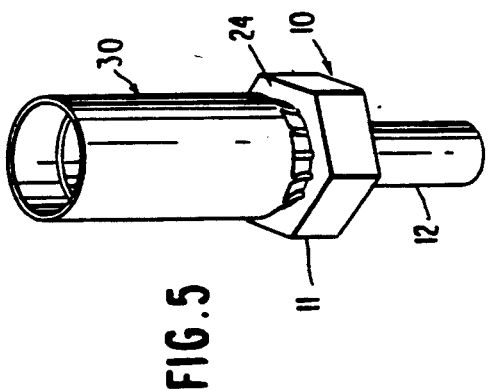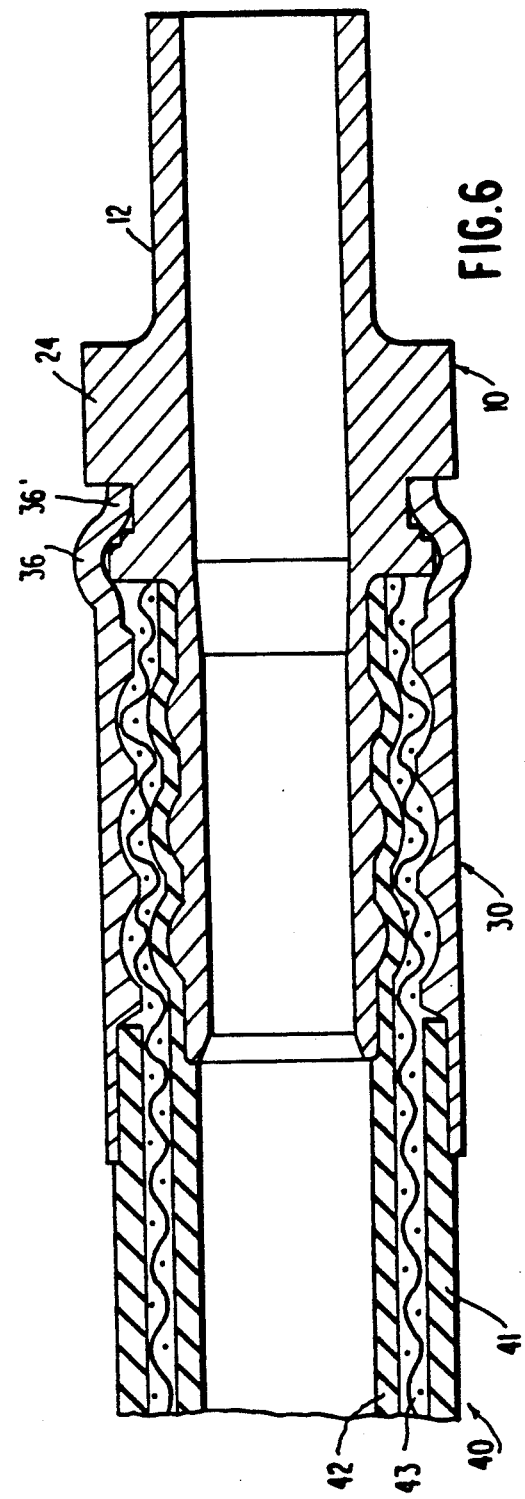

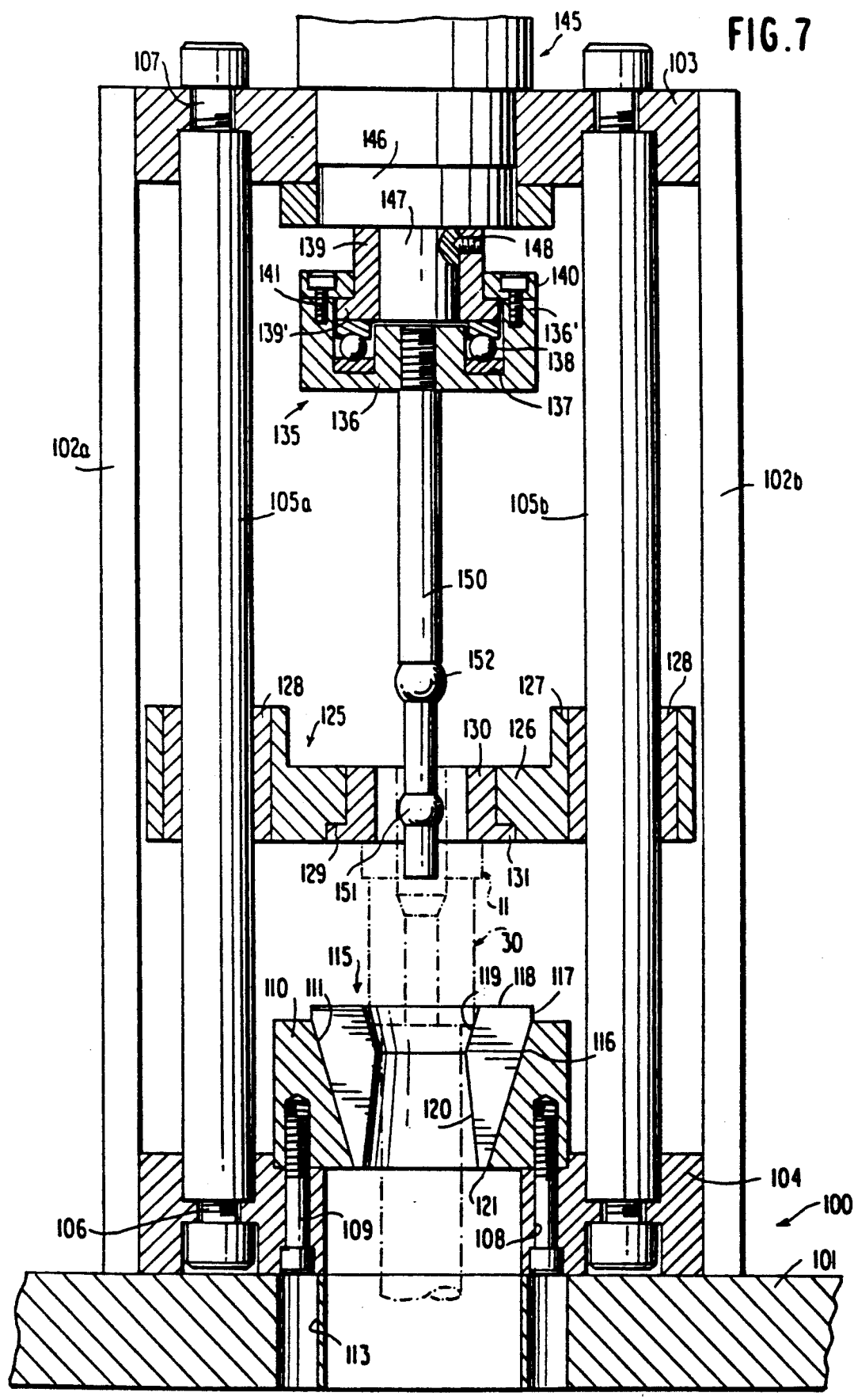

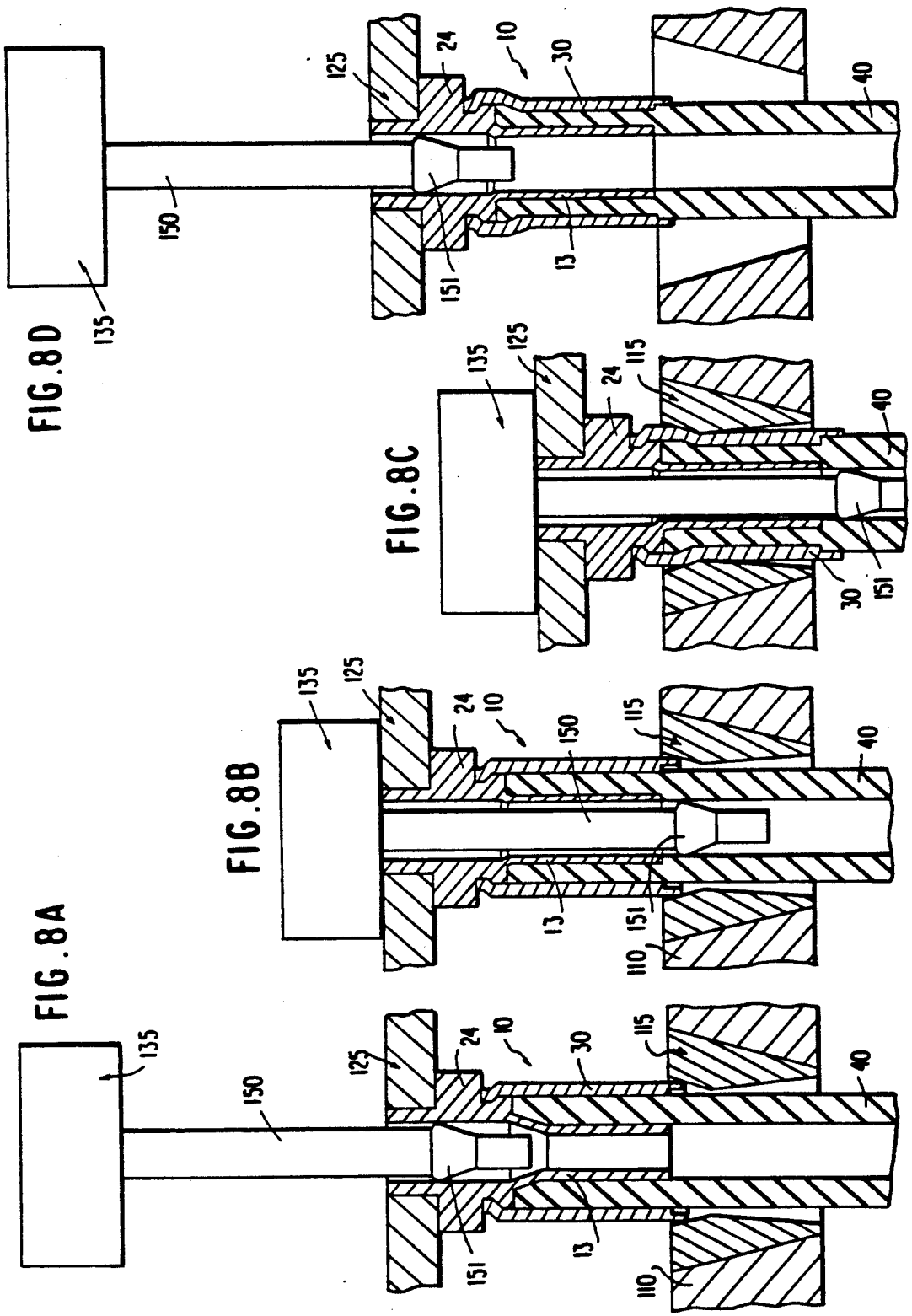

HIGH PRESSURE COUPLING

This is a divisional application of my application Ser. No. 07/472,280 pursuant to the requirement for restriction of Nov. 1, 1990, and now U.S. Pat. No. 5,031,301, issued Jul. 16, 1991.

FIELD OF INVENTION

The present invention relates to a high pressure hose coupling and to an apparatus for installing the same.

BACKGROUND OF INVENTION

Hose couplings in which either the nipple is to be internally expanded or an external sleeve member is to be reduced in its external diametric dimension within the area of overlap with the hose are known as such. The U.S. Pat. No. 1,786,489 to Hopkins, U.S. Pat. No. 1,825,005 to Loughead, U.S. Pat. No. 2,216,839 to Hoffman, U.S. Pat. No. 2,377,010 to Howard and U.S. Pat. No. 2,595,900 to Soos are representative of such prior art. Additionally, couplings are known in the prior art which propose both internal expansion of the nipple and external compression of the sleeve member, as for example in U.S. Pat. No. 2,399,790 to Conroy and U.S. Pat. No. 2,865,094 to Press. However all of these prior art couplings entail certain disadvantages which lessen their likelihood for successful use in high pressure applications. For example, sharp-edged teeth on the outside of the nipple or sharp-edged teeth on the inside of the sleeve member are likely to cause damage to the hose which seriously jeopardizes the holding ability. Additionally, in many instances the structural details of the couplings involve high manufacturing expenditures and complicated assembly and installation operations.

The aforementioned U.S. Pat. No. 2,399,790 to Conroy describes a method for permanently attaching hose couplings in which internal expansion of the nipple is initially commenced followed by reduction of the diameter of the outer shell. However, in this patent the outer shell is integral with the head and with the externally threaded end so that the stem or insert has to be either threadably connected with the head or held in place by a flanged arrangement resting on the shoulder of the head of the coupling. This means that prior to attaching the hose coupling of Conroy, the latter must be preassembled. Additionally, the ram cap directly engages with the head integral with the shell of the coupling so that the threaded, respectively, flanged connection between the insert and the coupling is likely to be subjected to large stresses.

SUMMARY OF THE INVENTION

The present invention is concerned with the task to provide a hose coupling which is capable of withstanding extraordinarily high pressures and assures a long length of life, yet at the same time can be accurately manufactured from high quality material in a relatively economic manner by machining. Additionally, the present invention is concerned with the task to provide a machine which is simple in construction yet offers great versatility and substantially facilitates the installation of the hose coupling over the hose-like object to be held thereby.

A coupling which is relatively simple in construction, easy to manufacture and relatively easy to install yet is able to withstand high pressures is described in my copending application Ser. No. 07/409,721, filed on Sept. 20, 1989, and now U.S. Pat. No. 5,127,157, issued Jul. 7, 1992. While the couplings described in my aforementioned copending application were able to withstand surprisingly high pressures, even higher pressures can be withstood with the use of the couplings in accordance with this invention in conjunction with reinforced rubber hoses provided with several layers of metallic reinforcement. The coupling in accordance with the present invention utilizes a sleeve-like member provided with internal rounded-off grooves machined into the same so that the external cylindrical surface of the sleeve-like member can be reduced in diametric dimension uniformly over its entire length in engagement with the hose-like object. This, in turn, permits the use of a machine allowing simplified installation of the coupling without increasing the cost of manufacture of the coupling in an excessive manner.

The underlying problems are solved according to the present invention in that the coupling consists of a nipple structure including a nipple portion provided with rounded-off external annular protuberances and a sleeve-like member provided with internal rounded-off circumferentially extending grooves whereby the sleeve-like member is adapted to be fixed onto the nipple structure by rolling, especially crimping the free end of the sleeve-like member facing the nipple structure into a groove between a collar and the head portion of the nipple structure, whereby sharp edges between the collar and the groove formed by a step, cut into the crimped free end of the sleeve-like member to assure a secure anchoring thereof onto the nipple structure.

According to another feature of the present invention, the sleeve-like member is provided with a section of increased internal diametric dimension terminating in a flared, rounded-off end at its free end opposite the connection of the sleeve-like member to the nipple structure. This permits the hose-like object to bend as ma be required in operation without experiencing damage due to the presence of the sleeve-like member.

The machine in accordance with the present invention utilizes a die assembly having internal die surfaces tapering in mutually opposite directions for reducing the external diametric dimensions of the sleeve-like member after the internal dimensions of the nipple structure are expanded by insertion of a reciprocating mandrel provided with expanding members which preferably increase in size as the mandrel proceeds in its inserting direction. The ram cap assembly thereby engages with the head portion of the nipple structure which facilitates the assembly of the coupling over the hose-like object. Additionally, the machine in accordance with the present invention is so constructed and arranged that the various parts thereof are interchangeable for different size couplings without having to change or modify the basic structure of the machine.

Accordingly, it is an object of the present invention to provide a high pressure hose coupling which is capable of withstanding extraordinarily high pressures and at the same time is easy to install and simple in construction as it consists only of two parts.

Another object of the present invention resides in a high pressure coupling of the type described above in which the two parts of the coupling can be readily manufactured and assembled on a hose-like object to be held thereby.

A further object of the present invention resides in a high pressure coupling of the type described above which can be readily machined and at the same time assures long life without danger of damage to the hose.

A still further object of the present invention resides in a machine for installing a high pressure coupling in accordance with the present invention on a hose-like object which is simple in construction, offers versatility in operation and permits ready interchange of the parts in case of change in the size of the coupling.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 4 is an axial longitudinal cross-sectional view through a sleeve-like member of a high-pressure coupling in accordance with the present invention;

FIG. 5 is a perspective view of a preassembled high-pressure hose coupling consisting of the nipple structure of FIG. 1 and the sleeve-like member of FIG. 4;

FIG. 6 is an axial longitudinal cross-sectional view through the hose coupling of FIG. 5, installed over a reinforced hydraulic hose;

FIG. 7 is a somewhat schematic view, partly in cross section, through a machine in accordance with the present invention for installing a high-pressure coupling over a hose-like object; and FIGS. 8A through 8D are somewhat schematic cross-sectional views illustrating the sequence of operations of the machine illustrated in FIG. 7.

DETAILED DESCRIPTION OF THE DRAWINGS

Figure 1:
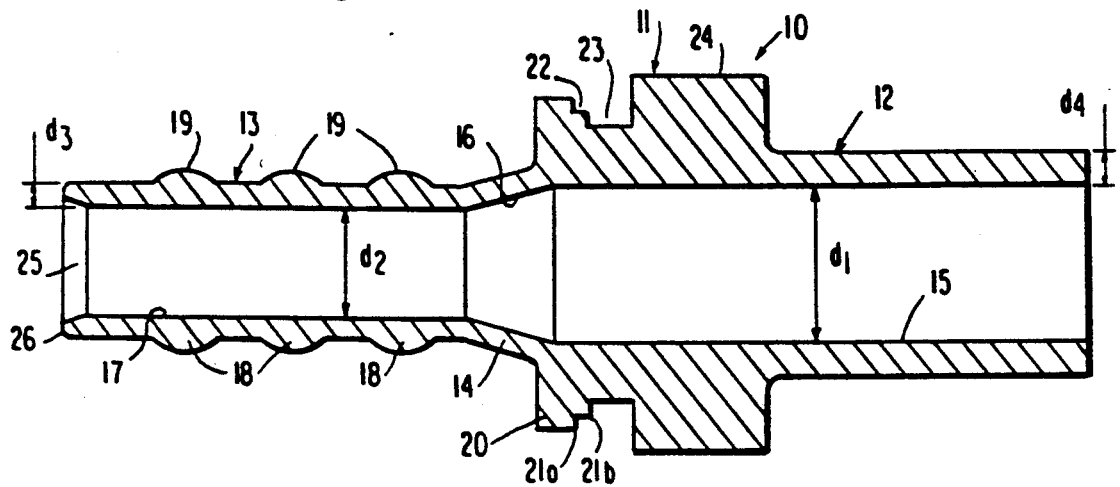
FIG. 1 is an axial longitudinal cross-sectional view through one embodiment of a nipple structure in accordance with the present invention.

Referring now to the drawing wherein like reference numerals are used throughout the various views to designate like parts, and more particularly to FIG. 1, reference numeral 10 generally designates therein a nipple structure in accordance with the present invention which consists of a main nipple portion generally designated by reference numeral 11, of a cylindrical connecting portion generally designated by reference numeral 12 for connection to some other part and extending from the main portion 11 toward the right as viewed in FIG. 1, and of a nipple portion generally designated by reference numeral 13 which extends from the main portion 11 toward the left side, as viewed in FIG. 1 The main portion 11 and the connecting portion 12 are provided with a bore 15 of substantially constant diametric dimension $d_1$. The nipple portion is provided with an internal bore 17 of smaller diametric $d_2$ than the bore 15 and is connected with the latter by way of a tapering bore 16 provided in the tapering connecting portion 14 connecting the nipple portion 13 with the main portion 11. The nipple portion 13 which has a normal wall thickness $d_3$ is provided with several circumferentially extending protuberances 18 in the illustrated embodiment of FIG. 1 with three annular beads or ribs 18 having rounded-off outer surfaces 19 which may be formed by a part of a circle. The main portion 11 includes starting from the tapering portion 14 and proceeding toward the right, a collar 20, two sharp edges 21a and 21b formed by a right angle step 22 leading to an annular groove 23 which in turn is adjoined by the head portion 24, preferably having a polygonal outer configuration, for example, a hexagonal configuration for engagement with a corresponding tool. The free left end of the nipple portion 13 terminates in a flared end 25 which is rounded off at 26 in order to minimize damage to the hose-like object. The tapering portion 14 has a wall thickness about the same as the normal thickness $d_3$ of the nipple portion 13 and extends at most only slightly underneath the collar 20 so as to minimize the work to be performed when the tapering portion 14 is expanded which depends on the overlying material thickness of the wall to be expanded. The wall thickness $d_4$ of the cylindrical connecting portion 12 can thereby be somewhat thicker than the normal wall thickness $d_3$ of the nipple portion as it is not subjected to any expansion as will be explained more fully hereinafter. The sharp edges 21a and 21b are important to assure a secure anchoring of the sleeve-like member as will be described more fully hereinafter.

Figure 2:
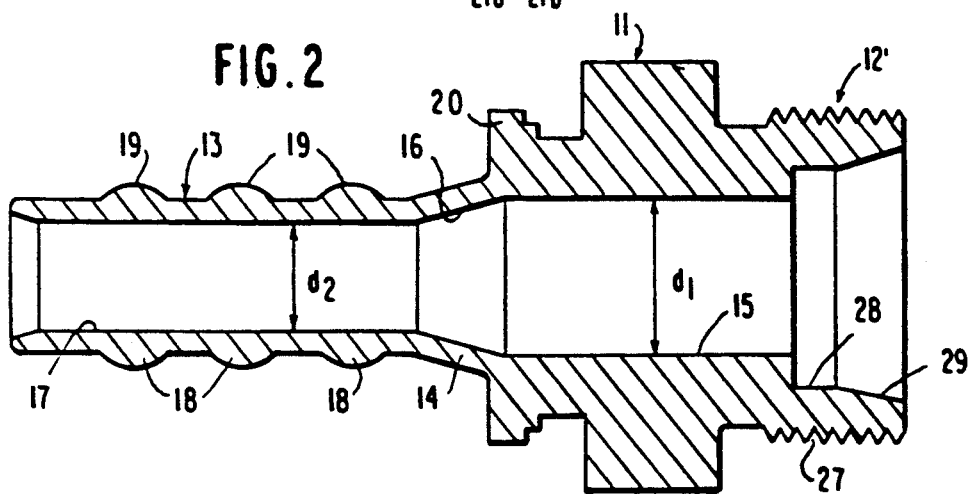
FIG. 2 is a longitudinal axial cross-sectional view through a modified embodiment of a nipple structure in accordance with the present invention.
Figure 3:
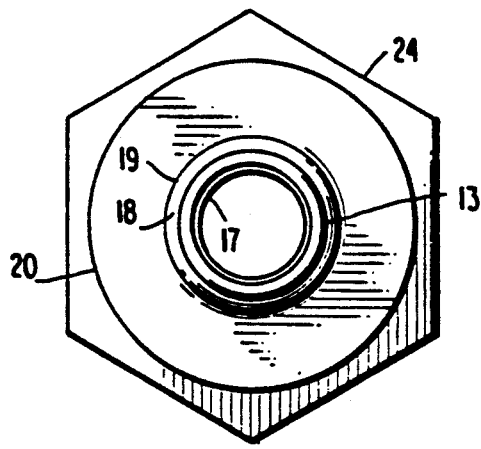
FIG. 3 is a left side end elevational view of the nipple structure of FIG. 2.

The nipple structure of FIG. 2 differs from the embodiment of FIG. 1 only in that the connecting portion 12 of FIG. 1 is replaced in FIG. 2 by a shorter externally threaded connecting portion 12' and in that the internal bore 15 passes over on the right-hand side into a short cylindrical bore section 28 of larger diameter which leads to the outside by way of the tapered bore section 29. The external threads 27 on the connecting portion 12' are for connection with an internally threaded member (not shown) of any known construction. FIG. 3 illustrates a left end view of the nipple structure of FIG. 2 in which the external surfaces of the head portion 24 of the nipple main portion 11 are shown as hexagonal surfaces.

FIG. 4 illustrates a sleeve-like member generally designated by reference numeral 30 for cooperation with a nipple structure such as shown in FIG. 1 or FIG. 2. The sleeve-like member 30 which is made from cylindrical stock includes a main portion 31 provided with several rounded-off annular grooves 32, in the illustrated embodiment with three annular grooves 32 of part-circular shape. The sleeve-like member 30 has an external diametric dimension $d_5$ and a normal internal diametric dimension $d_6$. The normal internal diametric dimension $d_6$ of the main portion 31 of the sleeve-like member 30 can be seen in the web portions 33 adjacent the annular grooves 32. The left end portion 34 of the sleeve-like member 30 has an internal diametric dimension $d_7$ which is larger than the diametric dimension $d_6$ and may even be slightly larger than the maximum depth of an annular groove represented by the dimension $d_8$. The left most web section 33 passes over into the larger internal bore of the left end portion 34 by way of a bevelled tapering section 35. The right end portion 36 of the sleeve-like member 30 has an internal bore 39 with a diametric dimension $d_9$ which is smaller than the internal bore $d_7$ and may even be somewhat smaller than the maximum diameter $d_8$ of the annular grooves 32. The internal bore of diametric dimension $d_6$ of the right-most web section 33 is connected with the internal bore 39 of the right end portion by way of a bevelled tapering section 37. The free end of the left end portion 34 of the sleeve-like member 30 is formed by a rounded-off tapering portion 38.

The nipple structure of FIGS. 1 and 2 as well as the sleeve-like member of FIG. 4 can be readily machined utilizing, for example, a programmed machine tool to assure economic operation. By utilizing machined parts, several advantages are obtainable. The dimensions can be carefully selected and made to accurate dimensions. It will also allow the use of a thicker material in the area of the annular ribs or beads 18 on the nipple portion 13 which in turn is more likely to maintain the given profile when the nipple portion is expanded. By being able to maintain accurate dimensions of the nipple structure and of the sleeve-like member, there is also greater assurance that the non-expanded outer diameter of the nipple portion 13 will permit easy insertion into the hose-like object. Additionally, the larger dimensions $d_7$ of the left end portion 34 of the sleeve-like member 30 which is rounded-off at 38, permits the hose to bend in its installed condition without likelihood of hose damage. The inner diameter $d_6$ of the main portion 31 of the sleeve-like member 30 which can also be maintained quite accurately, will permit the free end of the hose to fit easily into the space between the nipple portion 13 and the sleeve-like member 30. In case a reinforced hose is to be connected to the coupling of this invention, its hose end, which is preferably turned down to approximately the outer surface of the metallic braiding, will fit easily into the space between the nipple portion and the sleeve-like member. Furthermore, machining the various parts from various stock sizes will permit the manufacture of parts accurately matched to given hose types and hose sizes.

In actual use, the sleeve-like member 30 is slipped over the free hose end whereupon the nipple portion 13 of the nipple structure 10 is inserted into the free end of the hose. The nipple portion 13 is thereupon expanded as will be described more fully hereinafter by reference to FIG. 7 whereafter the external dimensions of the sleeve-like member 30 are reduced within the area of the nipple portion and the free end of the sleeve-like member facing the nipple structure is securely fixed to the nipple structure by rolling-in or crimping the free end portion 36 of the sleeve-like member 30 facing the nipple structure into the groove 23 in such a manner that the sharp edges 21a and 21b of the step 22 will cut into the inner surfaces of the thus-deformed free end portion of the sleeve-like member and thereby securely anchor the same onto the nipple structure, as indicated at 36' in FIG. 6.

In the alternative, the nipple structure 10 and the sleeve-like member 30 may be preassembled by rolling-in or crimping the free end portion 36 of the sleeve-like member 30 facing the nipple structure 10 into the groove 23 in the manner described hereinabove to provide the preassembled coupling illustrated in FIG. 5. As the various dimensions of the two machined parts constituting the thus-assembled nipple structure can be maintained accurately, assurance is given that the free end of the hose-like object will easily fit into the annular space between the nipple portion 13 and the sleeve-like member before the nipple portion is expanded and the sleeve-like member is thereafter reduced in its external diametric dimensions.

The assembly of the nipple structure 10 and of the sleeve-like member 30 thereby always takes place in such a manner that in the installed condition of the coupling, these two parts 10 and 30 are so axially aligned that the beads or ribs 18 of the nipple portion 13 coincide with the annular grooves 32 in the sleeve-like member 30.

It is thereby important to first expand the internal bore 17 of the nipple portion 13 before the external dimensions of the sleeve-like member 30 are reduced because this sequence of operation will assure that the internal dimensions of the expanded nipple portion, expanded to essentially the internal diametric dimension of the hose-like object, will remain substantially preserved notwithstanding the subsequent diametric reduction of the sleeve-like member.

In the event a reinforced hose is to be secured to the high-pressure coupling in accordance with the present invention, it is preferable to turn down the hose end to be inserted into the space between the sleeve-like member 30 and the nipple portion 13 so that the more or less exposed outer metallic surface of the reinforcement will increase the anchoring effects during the reduction of the diametric dimensions of the sleeve-like member as a result of metal-to-metal contact. FIG. 6 illustrates somewhat schematically a hydraulic hose generally designated by reference numeral 40 having a metallic wire reinforcement 43 embedded between the outer and inner rubber layers 41 and 42. In the illustrated embodiment, the reinforcement consists of four wire-spiral layers. As can be seen from FIG. 6, the outer layer 41 of the hose 40 has been turned down within the area to be held between the expanded nipple portion 13 and reduced main portion 31 of the sleeve-like member 30. This permits metal-to-metal contact between the wire layers of the hose reinforcement 43 and the internal surfaces of the sleeve-like member 30. Of course, the dimensions to which the sleeve-like member 30 is machined will take into consideration the turned-down dimensions of the hose.

In a typical example for a high-pressure hose coupling consisting of the nipple structure of FIG. 2 and of the sleeve-like member of FIG. 4 for use with a reinforced hose having an inner diameter of about 12 mm. and an outer diameter of about 24.5 mm., the length of the nipple structure is 66 mm.; the length of the connecting portion 12' is 14 mm.; the length of the head portion is 10 mm. while the collar 20 is 2.5 mm. in length with the step about 1 mm. in axial length. The left-most annular rib 18 is spaced 9 mm. from the left end of the nipple portion 13 with the two further annular ribs 18 spaced each about 8 mm. from one another.

The internal diameter $d_1$ is 11.5 mm.; the internal diameter $d_2$ is 8 mm.; the outer diameter of the normal nipple portion is 11 mm., and the maximum thickness of the annular beads 18, i.e., the maximum radial dimension of the annular ribs 18 is 13 mm. The collar 20 has an outer diametric dimension of 24 mm. dimension of 24 mm. and the outer diametric dimension of 20 mm. of the groove 23. The diametric dimension of the bore section 28 is 16 mm. whereby the transition from the tapering portion 14 into the collar 20 and the transition from the connecting portion 12' or 12 in FIG. 1 are rounded off. The sleeve-like member 30, for use with the same hydraulic hose having its free end turned down to expose the outer surface of the metallic braid is as follows: the external diametric dimension of the non-deformed sleeve-like member $d_5$ is 28 mm.; the diametric dimension $d_9$ of the internal bore 39 of the right end portion 36 is 24 mm., the internal diametric dimension $d_7$ of the left end portion 34 is 26 mm.; the normal internal dimension $d_6$ of the main portion 31 is 22 mm. with a maximum depth of the annular grooves 32 having a diametric dimension $d_8$ of 25 mm. The overall length of the sleeve-like member 39 is 49 mm. with the left end and right end portions 35 and 36 each about 10 mm. in axial length, with the annular grooves 32 equally spaced from one another at 8 mm. and with the maximum depth of the left-most annular groove 32 being at 16 mm. from the end of the left end portion 34 of the sleeve-like member 30.

In the installed condition illustrated in FIG. 6, the internal diametric dimension of the nipple portion 13 is expanded to about 11 mm in diameter while the external diametric dimension of the sleeve-like member 30 is reduced to about 26 mm. The foregoing are merely typical dimensions for a given hydraulic hose which can be varied as known to a person skilled in the art for different sizes and types of hoses.

A machine for assembling a high-pressure coupling onto the end of a hose-like object is illustrated in FIG. 7. The machine of FIG. 7 includes a frame generally designated by reference numeral 100 which includes a main base frame member 101 and two upright frame members 102a and 102b interconnected by a top frame member 103 and a bottom frame member 104. Guide columns 105a and 105b are threadably secured in the top and bottom frame members 103 and 104 by threaded connections 106 and 107. A die holder 110 is threadably secured to the bottom frame member 104 by means of bolts 109 extending through the bores 108 in the bottom frame member 104. The base frame member 101 is provided with bores 113 to permit access to the bolts 109. The die holder 110 is provided with inwardly downwardly tapering conical surfaces 111 for cooperation with complementary external tapering conical surfaces 116 of a die generally designated by reference numeral 115. The external tapering surfaces 116 of the die 115 are adjoined at the top by a short cylindrical surface 17. The die 115 is provided with a flat top surface 118 and a downwardly inwardly tapering first conical surface 119 adjoined by a downwardly outwardly tapering second conical surface 120. As the die holder 110 and the die 115 are circular in configuration, the surfaces 111, 116, 119 and 120 are conical surfaces. A flat bottom 121 of the die 115 is substantially flush with the bottom surface of the die holder 110.

A ram cap assembly generally designated by reference numeral 125 includes a ram cap member 126 of disk-like shape which includes a sleeve-like extension 127 slidably guided on guide columns 105a and 105b by way of slide bearings 128. An undercut 129 in the ram cap member 126 interchangeably accommodates a guide member 130 suitably secured to the ram cap member 126 in any known manner (not shown). The internal diametric dimension of the guide member 130 is thereby matched to the connecting portion 12 or 12' of the nipple structure 10 of FIGS. 1 and 2. The guide member 130 which is of approximately L-shape in cross section, includes radially outwardly extending leg portions 131 fitting into the undercut 129.

The ram head assembly generally designated by reference numeral 135 includes a main ram head member 136 provided with an axially extending rim portion 136'. The main ram head member 136 is provided with an annular recess 137 to accommodate a roller bearing 138. A connecting member 139 which is also of approximately L-shape in cross section, includes short leg portions 139' fitting into the space between the top of the bearing 138 and a top plate 140 threadably secured to the rim portion 136' of the main ram head member 136, the leg portions 139' being radially surrounded by the rim portions 136'. The top plate 140 is threadably secured to the main ram head member 136 by bolts 141.

The ram mechanism generally designated by reference numeral 145 may be of any known construction and is therefore not shown in detail herein. The ram mechanism includes a ram member 146 connected with a ram shaft 147 which in turn can be adjustably secured to the connecting member 139 by one or more set screws 148. It is understood that the various parts so far described are of disk-like configuration.

A reciprocating spindle 150 which, threadably secured to the main ram head member 136, includes a first expanding member 152 followed by a second expanding member 152 of larger dimension that the expanding member 151 so that, as the spindle is moved downwardly into the bore of the nipple structure, the expanding member 151 will first expand the internal bore of the conical connecting portion and of the nipple portion whereby the second expanding member 152 will then further expand the internal dimensions thereof. Of course, any number of expanding members of any appropriate shape may be used. As the ram head assembly 135 moves downwardly together with the expanding mandrel 150, it will come into engagement with the ram cap assembly 125 while the tapering portion 14 and the nipple portion 13 are internally expanded to a diameter corresponding essentially to the internal diameter of the hose-like object. As can be seen from FIG. 7, the disk-like recess, rectangular in cross section, formed in the top of the ram cap assembly 125 is large enough to accommodate the disk-like ram head assembly 125, also rectangular in cross section as seen in FIG. 7. Continued downward movement of the ram head assembly 135 and ram cap assembly 125 will cause engagement of the latter with the head portion 24 of the nipple structure 10 and will cause the nipple structure 10 and therewith the sleeve-like member 30 to be forced into the tapering section 119 of the die 115 as the ram head and ram cap assemblies 135 and 125 continue their downward movement, actuated by the ram mechanism 145. This in turn will force the sleeve-like member 30 to undergo a reduction of its external diametric dimensions as it slides along the tapering surface 119 and passes through the area of greatest restriction formed by the intersection of die surfaces 119 and 120. Upon completion of the downward stroke of the ram head assembly 135, of the ram cap assembly 125 and of the mandrel 150, which completes the assembly operation, the spindle 150 is withdrawn form the now established high-pressure coupling which causes the latter to be frictionally taken along in the upward movement as will be explained by reference to FIGS. 8A through 8D, until the thus-assembled hose and high pressure coupling is removed by opening the split die 115.

OPERATION

The operation of the machine illustrated in FIG. 7 will now be described by reference to FIGS. 8A through 8D, schematically illustrating the various positions of the parts of this machine in the course of the assembly operation.

FIG. 8A illustrates the parts in their respective positions before the operation of the machine is commenced. The ram head assembly 135 together with the mandrel 150 carrying an expanding member(s) 151 are in their retracted position, i.e., in which the ram mechanism has returned these parts to their normal upper position. The high-pressure coupling 10 of this invention which in this case may be a preassembled coupling as shown in FIG. 5, is mounted over the free end of the hose 40 which has been inserted from below through the die 115 until the hose end abuts at the main portion 24 with the open end of the sleeve-like member 30 now resting on the inwardly tapering surface of the die 115. The ram cap assembly 125 rests against the free shoulder of the main portion 24.

During downward movement of the ram head assembly 135 together with its mandrel 150, the expanding member 151 which is of smaller external dimension that the inner diameter $d_1$ of bore 15 (FIGS. 1 and 2) engages with the conical portion 14, and after internal expansion thereof, with the internal bore 17 of the nipple portion 13 to expand the same to an internal diameter corresponding approximately to the internal diameter of the hose. When the ram head assembly 135 comes into contact with the ram cap assembly 125, the expanding member 151 has completed its expanding operation. The set screw connection 148 (FIG. 7) permits the necessary adjustment for different configurations of the nipple and in particular of the connecting portion 12 and 12' thereof. The parts are now in the position illustrated in FIG. 8B. As the hydraulic ram mechanism continues its downward movement, the sleeve-like member 30 is now forced into the die 115 and because of the conically tapering surface 199 thereof (FIG. 7) is shrunk to the desired external dimension. FIG. 8C illustrates the position of the parts in the lowermost position of the ram mechanism. As can be seen, the deforming pressure produced by the ram mechanism is transmitted from the ram head assembly 135 by way of the ram cap assembly 125 onto the nipple main portion 24 which in turn applies the necessary axial displacement force to the sleeve member 30 which had been previously secured to the nipple structure as described above.

Upon completion of the internal expansion and external compression operations, the ram mechanism withdraws the ram head assembly 135 together with the mandrel 150 by lifting the same. As the external compression may have slightly reduced the internal diameter of the previously expanded nipple portion 13, the frictional forces between the expanding member 151 and the nipple portion 13 will also cause the coupling 10 together with the hose 40 to be lifted, taking along also the ram cap assembly 125 guided on the guide columns 105a and 105b (FIG. 7). Furthermore, frictional engagement between the external surface of the sleeve-like member 30 and the die 115 is likely to left the die 115 out of the die holder 110. When upward movement of the ram cap assembly 125 on the guide columns 105a and 105b is limited by a stop member (not shown) of any conventional construction, the ram cap assembly 125 together with the coupling 10 assembled over the hose 40 will come to a stop so that continued upward movement of the ram head assembly 135 together with the mandrel 150 overcome any friction between the expanding member 151 and the previously expanded bore 17 and will cause thereby the expanding member 151 to re-expand the nipple portion 13 to its predetermined internal diametric dimension. After completion retraction of the ram head assembly 135 and mandrel 150, the split die 115 can now be opened so that the parts now find themselves in the position illustrated in FIG. 8D.

In case the connecting part of the nipple structure is provided with an external thread, it may be appropriate to provide the ram cap assembly 125 with a complementary internal thread so that the assembled coupling can be securely screwed into the same. As the ram forces are transmitted from the ram head assembly 135 to the main portion 24 of the nipple structure by way of the ram cap assembly 125, such threaded connection would not be subjected to any undue stresses.

The machine according to the present invention illustrated in FIG. 7 offers a number of advantages. It is simple in construction and involves relatively few parts. It can be easily manipulated and additionally offers the significant advantage that the parts thereof can be readily exchanged to conform to the changed dimensions of different sizes of the coupling whose dimensions are, in turn, selected in accordance with the size of a given hose.

While I have shown and described several embodiments in accordance with the present invention, it is understood that the same is not limited thereto but is susceptible of numerous changes and modifications as known to those skilled in the art. For example, the coupling in accordance with the present invention may also be installed by other methods, as, for example, disclosed in my copending application Ser. No. 07/409,721. Additionally, the various parts may also be modified to meet particular requirements by changing the dimensions and/or structural details thereof. Thus, I do not wish to be limited to the details shown and described herein by intend to cover all such changes and modifications as are encompassed by the scope of the appended claims.

I claim:

1. A high-pressure coupling for a hose-like object to be securely fastened thereby, comprising:

a nipple structure including a main portion, a connecting nipple portion extending from said main portion in one axial direction of the nipple structure and terminating in a free end, a nipple portion extending from said main portion in the other axial direction of the nipple structure, said nipple portion having spaced, circumferentially extending protuberances whose external surfaces are rounded-off, said main portion including a collar portion, sharp-edged step means between said collar portion and a circumferential groove which is adjoined by a head portion, as viewed in the direction from the nipple portion in the one axial direction, said nipple portion being connected with said collar portion by way of a tapering portion, said main portion and at least a part of said connecting portion being provided with an axial bore of a substantially constant first diameter, said nipple portion being provided with an axial bore of a substantially constant second diameter smaller than said first diameter which passes over into the axial bore of said first diameter by way of a tapering bore in said tapering portion, said tapering portion being of substantially constant thickness over a major part of its length and having a thickness approximately the same as the normal thickness of the nipple portion within the area between circumferentially extending protuberances, the tapering bore of said tapering portion extending at most only a slight distance underneath the collar portion, said collar portion having an external dimension smaller than the external dimension of the head portion, and a sleeve-like member for cooperation with said nipple structure to define a space accommodating the hose-like object when assembled over said nipple structure, said sleeve-like member having a substantially cylindrical external surface and including a main portion provided with rounded-off internal circumferential grooves, the main portion of said sleeve-like member having a normal internal diametric dimension smaller than the external dimensions of the collar portion and being adjoined in said one axial direction by a connecting portion and in the other axial direction by an end portion, the connecting portion of said sleeve-like member having an internal diametric dimension larger than the normal internal diametric dimension of its main portion and at least slightly larger than the external dimensions of the collar portion so as to slidably fit over the same, and the end portion of said sleeve-like member having an internal diametric dimension at least as large as the internal diametric dimensions of the connecting portion of the sleeve-like member and increasing in its internal diametric dimension toward its free end without sharp edge to minimize damage to a hose-like object during bending thereof.

2. A high-pressure coupling according to claim 1, wherein said sleeve-like member is preassembled onto the nipple structure by crimping the free end of the connecting portion into the circumferential groove of the main portion of the nipple structure in such a manner that the sharp-edges step means cut into the crimped free end of the connecting portion of the sleeve-like member to securely anchor and fix the sleeve-like member on said nipple structure.

3. A high-pressure coupling according to claim 2, wherein the axial length of the collar portion as well as its external dimensions are so chosen in relation to the internal dimensions of the connecting portion of the sleeve-like member that the collar portion can serve as centering means for the sleeve-like member.

4. A high-pressure coupling according to claim 1, wherein said nipple structure and said sleeve-like member are provided as separate parts to be securely connected with each other by crimping the free end of the connecting portion of the sleeve-like member into the circumferential groove of the main portion of the nipple structure in securely anchoring relationship with the sharp-edged step means, after the sleeve-like member and the nipple structure are assembled over, respectively, into the hose-like object.

5. A high-pressure coupling according to claim 1, wherein the nipple structure is made from a single piece of material.

6. A high-pressure coupling according to claim 1, wherein the sleeve-like member is made from a single piece of material.

7. A high-pressure coupling according to claim 1, wherein the free end of the nipple portion terminates in a rounded-off end.

8. A high-pressure coupling according to claim 7, wherein the connecting portion of the nipple structure is a substantially cylindrical part of substantially constant thickness and external dimensions.

9. A high-pressure coupling according to claim 7, wherein the connecting portion of the nipple structure is provided with an external threaded portion for connection with complementary internal threads of a part to which the coupling is to be connected.

10. A high-pressure coupling according to claim 9, wherein the connecting portion of the nipple structure is provided with an internal bore section of larger internal dimensions than the axial bore of said first diameter and terminating in a tapered bore section leading to the outside.

11. A high-pressure coupling according to claim 1, wherein the transition from said tapering portion into the collar portion is rounded-off.

12. A high-pressure coupling according to claim 1, wherein the normal external dimensions of the connecting portion of the nipple structure are smaller than the external dimensions of the collar portion.

13. A high-pressure coupling according to claim 1, wherein said collar portion has a cylindrical external surface, while said head portion has a polygonal external surface for engagement with a tool.

14. A high-pressure coupling according to claim 1, wherein the free end of the end portion of the sleeve-like member terminates in a rounded-off configuration.

15. A high-pressure coupling according to claim 14, wherein the rounded-off configuration of the free end of the end portion of the sleeve-like member, in effect, also provides a slight taper.

16. A high-pressure coupling according to claim 1, wherein the inner diameter of the end portion of said sleeve-like member is larger than the inner diameter of the connecting portion of said sleeve-like member.

17. A high-pressure coupling according to claim 1, wherein the circumferential grooves in the main portion of the sleeve-like member are part-circular in shape in an axial cross section, and wherein the maximum diametric dimension of a circumferential groove is within the range between the inner diametric dimension of the end portion of the sleeve-like member and the inner diametric dimension of the connecting portion of the sleeve-like member.

18. A high-pressure coupling according to claim 1, wherein the normal inner diametric dimension of the main portion of the sleeve-like member is connected with the inner diametric dimensions of the connecting portion and of the end portion of the sleeve-like member by way of tapering portions.

19. A high-pressure coupling according to claim 1, wherein the nipple structure and the sleeve-like member are so dimensioned that in the assembled position thereof the peaks of the circumferentially extending protuberances of the nipple portion coincide at least approximately with the troughs of the circumferentially extending grooves in the sleeve-like portion while the parts of the nipple portion between adjacent circumferentially extending protuberances and having the normal nipple portion thickness correspond at least approximately with the parts of the main portion of the sleeve-like member having the normal internal diametric dimension.

20. A high-pressure coupling according to claim 1, wherein said nipple structure and said sleeve-like member are machined from cylindrical stock.

* * * * *